(12) United States Patent
Wang et al.

(10) Patent No.: US 10,836,099 B2
(45) Date of Patent: Nov. 17, 2020

(54) POLYMER REINFORCED MATERIALS FOR INKJET BASED 3D PRINTING

(71) Applicant: Inkbit, LLC, Medford, MA (US)

(72) Inventors: Wenshou Wang, Quincy, MA (US); Gregory Ellson, Cambridge, MA (US); Yan Zhang, Lowell, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/655,918

(22) Filed: Oct. 17, 2019

(65) Prior Publication Data

US 2020/0122385 A1    Apr. 23, 2020

Related U.S. Application Data

(60) Provisional application No. 62/746,818, filed on Oct. 17, 2018.

(51) Int. Cl.

| | |
|---|---|
| *C08F 2/46* | (2006.01) |
| *C08F 2/50* | (2006.01) |
| *C08G 61/04* | (2006.01) |
| *B29C 64/106* | (2017.01) |
| *B29C 64/264* | (2017.01) |
| *C08L 33/08* | (2006.01) |
| *C08L 33/12* | (2006.01) |
| *C08L 39/06* | (2006.01) |
| *C08L 81/02* | (2006.01) |
| *B33Y 10/00* | (2015.01) |
| *B33Y 70/00* | (2020.01) |
| *B33Y 80/00* | (2015.01) |

(52) U.S. Cl.
CPC .......... *B29C 64/106* (2017.08); *B29C 64/264* (2017.08); *C08L 33/08* (2013.01); *C08L 33/12* (2013.01); *C08L 39/06* (2013.01); *C08L 81/02* (2013.01); *B33Y 10/00* (2014.12); *B33Y 70/00* (2014.12); *B33Y 80/00* (2014.12)

(58) Field of Classification Search
CPC ........ C08L 39/06; C08L 33/066; C08L 33/08; C08L 33/12; B29C 64/106; B29C 64/264; B33Y 70/00; B33Y 10/00; B33Y 80/00
USPC .................. 522/71, 189, 184, 6, 1; 520/1
See application file for complete search history.

(56) References Cited

U.S. PATENT DOCUMENTS

| | | |
|---|---|---|
| 3,931,287 A | 1/1976 | Kehr et al. |
| 5,270,368 A | 12/1993 | Lent et al. |
| 5,889,084 A | 3/1999 | Roth |
| 8,846,777 B2 | 9/2014 | Bowman et al. |
| 9,441,084 B2 | 9/2016 | Heardon |
| 10,252,466 B2 | 4/2019 | Ramos et al. |
| 10,456,984 B2 | 10/2019 | Matusik et al. |
| 2002/0104973 A1 | 8/2002 | Kerekes |
| 2003/0092820 A1 | 5/2003 | Schmidt et al. |
| 2014/0107314 A1 | 4/2014 | Kawato et al. |
| 2014/0239527 A1 | 8/2014 | Lee |
| 2016/0257843 A1 | 9/2016 | Boydston et al. |
| 2016/0376453 A1 | 12/2016 | Hearon |
| 2017/0226267 A1 | 8/2017 | Shinohara et al. |
| 2017/0291357 A1 | 10/2017 | Fong et al. |
| 2018/0009932 A1 | 1/2018 | Hearon et al. |
| 2019/0283316 A1 | 9/2019 | Rolland et al. |
| 2019/0322031 A1 | 10/2019 | Kritchman |

FOREIGN PATENT DOCUMENTS

| | | |
|---|---|---|
| WO | 2017/134674 A1 | 8/2017 |
| WO | 2018026829 A1 | 2/2018 |

OTHER PUBLICATIONS

Ligon et al, Polymers for 3D Printing and Customized Additive Manufacturing, Jul. 20, 2017, Chem. Rev., 117, 10212-10290 (Year: 2017).*

Ligon, Samuel Clark, Robert Liska, Jürgen Stampfl, Matthias Gurr, and Rolf MuREWORKlhaupt. "Polymers for 3D printing and customized additive manufacturing." Chemical reviews 117, No. 15 (2017): 10212-10290.

Mendes-Felipe, Cristian, Juliana Oliveira, Ikerne Etxebarria, José Luis Vilas-Vilela, and Senentxu Lanceros-Mendez. "State-of-the-Art and Future Challenges of UV Curable Polymer-Based Smart Materials for Printing Technologies." Advanced Materials Technologies 4, No. 3 (2019): 1800618.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

* cited by examiner

*Primary Examiner* — Jessica Whiteley
(74) *Attorney, Agent, or Firm* — Cooley LLP

(57) ABSTRACT

The present disclosure relates to reinforcing photopolymer resins and uses thereof, e.g., in inkjet 3D printing.

30 Claims, No Drawings

POLYMER REINFORCED MATERIALS FOR INKJET BASED 3D PRINTING

RELATED APPLICATIONS

The application claims the benefit of the Oct. 17, 2018 priority of U.S. Provisional Application 62/746,818, the contents of which are herein incorporated by reference.

FIELD OF THE INVENTION

The invention relates generally to 3D inkjet printing and more specifically to the printing of reinforcing material in using a 3D inkjet printer.

BACKGROUND OF THE INVENTION

Additive manufacturing allows objects to be fabricated via selective addition of material. A typical additive manufacturing process works by slicing a digital model (for example, represented using an STL file) into layers. Data representing these layers is then sent to a fabrication apparatus. The fabrication apparatus then builds an object by depositing one layer at a time, starting with a bottom layer and ending with a top layer. Additive manufacturing is rapidly gaining popularity in a variety of markets including automotive, aerospace, medical devices, pharmaceuticals, and industrial tooling.

The growth of additive manufacturing processes has led to the commercialization of various species of such processes. These include extrusion processes, such as fused deposition Modeling® (FDM®) light polymerization processes, such as stereolithography (SLA) and multijet/polyjet powder bed fusion processes, such as selective laser sintering (SLS) or binder jetting, and lamination processes, such as laminated object manufacturing (LOM).

Nevertheless, despite its growth, additive manufacturing has limitations. Among these limitations are the constraints in the materials that can be used in conjunction with such processes. Only limited types of materials can be used. The performance of these materials limits the efficiency of the manufacturing process and the quality of the manufactured object.

One example of an additive manufacturing process relies on 3D printing using an inkjet printer. In this example, printheads build an object by depositing droplets of liquid ink. These printheads are typically mounted on a gantry system to allow deposition of ink in different locations of a build volume. A build platform may also move with respect to the printheads, which may be stationary. The liquid ink is then solidified, for example by using UV or visible-light radiation.

Because of its high resolution, its high throughput, and its ability to print multiple materials, an inkjet printers are particularly useful for building prototypes. These printers typically rely on low-viscosity acrylates. The resulting structures are useful as prototypes but lack the durability and strength that would be desired in an actual end product.

In some systems, multiple printheads build objects with multiple base materials. For example, materials that have different optical, mechanical, thermal, or electromagnetic properties can be used. These materials can be combined to achieve composite materials with a wide range of properties.

An inkjet printer that carries out additive manufacturing typically has a subsystem for curing the ink. These subsystems typically rely on UV curing.

In a UV-curing unit, UV radiation solidifies inks via photo-initiation of a polymerization reaction. UV radiation can be supplied by a variety of different mechanisms, such as arrays of LEDs and mercury or xenon arc lamps. UV-curing is typically applied after each printed layer or after depositing each material within a layer. The UV-curing unit can be fixed with respect to the printer or it can move independently with respect to the object.

Some inkjet printers that carry out additive manufacturing combine both UV and thermal curing to manufacture an object.

Inks suitable for inkjet printing often conform to certain specifications. Of particular importance are the ink's viscosity and its surface tension. Suitable viscosities are in the range of 10-15 cps at operating conditions. Surface tension typically should be between 20-45 mN/m.

An ink is preferably thermally stable. For example, it should not solidify anywhere within the ink jet printer. In particular, it should remain liquid within the printhead, the ink container, and the feeding system.

It is also useful for the ink to have formulation stability. In particular, the different components of the ink should not separate for a reasonably long time.

Many inks include additives. These additives include colorants, such as dyes or pigments or the mixture of pigments and dyes. These colorants are dispersed or dissolved in the ink. Some inks also include surfactants adjust the surface tension of the ink. These surfactants promote jetting or printing performance.

Since different inks have different properties, it is necessary to optimize various parameters based on these different properties. As one example, the process of inkjet printing requires causing the printhead to eject the ink. This is carried out by applying a waveform to the print head. The shape and duration of this waveform depends on the nature of the ink to be ejected. Therefore, it is important to optimize this waveform for different ink formulations.

SUMMARY OF THE INVENTION

The invention provides ways to reinforce the materials used in 3D inkjet printing.

Upon being cured, an ink becomes a polymer matrix. It is possible to improve the strength of such a matrix by adding a reinforcing filler material. Examples of suitable filler materials include carbon black, silica, clay, glass fibers, and carbon nanotubes. It is particularly useful to add filler materials at high loading fractions, often 30-100 phr, in order to adequately improve the strength of the cured polymer matrix.

Although adding a filler material provides reinforcement, the high loading fraction of filler that is required to achieve meaningful strengthening increases the resin viscosity. This can push viscosity beyond what is acceptable for use as an ink in a 3D printer.

The use of filler material also causes difficulty because the ink must remain a homogenous liquid until it is cured. This requires that the filler material disperse well and that it be stable over long periods of time. This limits both the maximum amount of filler and the type of filler material that is usable with photopolymers.

Some 3D printing methods, particularly those that rely on inkjet printing, have even stringent requirements that further limit the ability to disperse filler. For example, an inkjet printer may encounter difficulty if there exist particles in the ink that exceed a maximum particle size.

One aspect of the invention is related to printing using an ink that is initially liquid but that transforms, during curing, into a 3D matrix material in which a constituent of the liquid ink forms a second phase within the 3D printable matrix material. This second phase adds strength and support to the 3D printable matrix material. The result is therefore a reinforced matrix material that provides additional strength and durability to objects that have been built using a 3D inkjet printing process.

In one embodiment, the invention relates to a method of reinforcing photopolymer resins for improved tensile strength while maintaining the processability of matrix resins.

In another embodiment, the reinforcing agent is initially soluble or partially soluble in the uncured matrix material resin but undergoes a decrease in solubility when the uncured matrix material resin is cured.

In yet another embodiment, the reinforcing agent initially is soluble or partially soluble in the uncured matrix material resin but undergoes a decrease in solubility when the uncured matrix material resin undergoes a temperature change. This causes the reinforcing material to precipitate from solution and to separate into a different phase. This forms domains of rigid material that serve to strengthen the polymer matrix.

In another aspect, the invention relates to a reinforced composition for 3D ink printing comprising: a UV-curable matrix material and a reinforcing agent that is at least partially soluble in the UV-curable matrix material.

Embodiments include those in which the UV-curable matrix material includes acrylates, thiol-enes, or combinations thereof.

In other embodiments, the reinforcing agent is selected based at least in part on one or more properties of the UV-curable matrix material.

In yet other embodiments, the reinforcing agent has a higher glass transition temperature than that of the UV-curable matrix material.

Further embodiments include those in which the reinforcing agent is non-UV-curable and those in which the reinforcing agent does not react with the UV-curable matrix material.

Also among the embodiments are those in which the tensile strength of the cured reinforced composition is 30-300% higher than the UV-curable matrix material in the absence of any reinforcing agent and those in which the tensile strength of the cured reinforced composition depends at least in part upon the loading of the reinforcing agent within the reinforced composition.

Further embodiments include those in which the content of reinforcing agent is less than 20 wt % in the overall formulation.

A variety of reinforcing agents can be used. These include, as representative examples, polyvinylpyrrolidone and a poly(methyl methacrylate).

DESCRIPTION OF A PREFERRED EMBODIMENT

A composition of the 3D printable material includes a printable matrix material, which is curable, and a reinforcing agent. The printable matrix material is typically a monomer that polymerizes under UV irradiation. The printable matrix material is generally, but not limited to, acrylates, thiol-enes or combinations thereof.

The reinforcing agent is not UV-curable and is non-reactive with the printable matrix material. The reinforcing agent is, however, at least partially soluble in the printable matrix material. The reinforcing agent and the printable matrix material may be mixed as liquids, or the reinforcing agent may be dissolved as a solid into the liquid printable matrix material to form a solution. The reinforcing agent has a higher glass transition temperature (Tg) than the printable matrix material. In one embodiment, the reinforcing agent constitutes less than 20% of the matrix material-reinforcing solution by weight.

Although the reinforcing agent is at least partially soluble in the printable matrix material, as the printable matrix material is cured under UV irradiation or otherwise undergoes a temperature decrease, the reinforcing agent becomes less soluble and precipitates out of solution forming another phase within the printable matrix material. This phase forms reinforcing structures within the curing matrix material.

The principle may be understood by considering the following non-limiting examples.

EXAMPLE 1

Material: Acrylate Matrix Reinforced by a Vinylpyrrolidone

In this embodiment, IPUC101, an inventor-formulated elastomeric acrylate material, is reinforced by Polyvinylpyrrolidone (PVP) (Mw: 6000-150000). IPUC101 is a self-formulated (see Table 1), elastomeric acrylate material with a tensile strength of 3.4 MPa, elongation at break of 160%, and Shore hardness of 35 A. The reinforcing agent is Polyvinylpyrrolidone (PVP) K15, purchased from Tokyo Chemical Industry Co. Ltd. The reinforcing agent PVP is a polymer known for having high polarity. Because this formulation of IPUC101 includes almost 30% 2-Hydroxyethyl acrylate (HEA), IPUC101 is also polar to some extent. The HEA in the IPUC101 helps the PVP to dissolve or disperse into the uncured material. The reinforcing effect on IPUC101 is a function of both the composition of reinforcing agent and the concentration of the reinforcing agent. In this embodiment using PVP, the molecular weight was shown to have a large effect on the reinforcement.

Preparation of PVP-Reinforced IPUC101

In one embodiment, the desired amount of PVP and IPUC101 were dispensed into a sealed amber bottle. The mixture was stirred at elevated temperature (for example 70° C.) until all solids were dissolved. In another embodiment, the PVP powder and IPUC101 were added into a container and mixed using a Flextek mixer (Flex-Tek Group, Greenwood, S.C., USA) at room temperature until the powder was uniformly dissolved in the solution. Each resulting solution was either clear or slightly cloudy. The inks were stored at room temperature until use.

The reinforcing effect of adding PVP K15 to the IPUC101 formulation is shown in Table 2. The tensile strength and Shore hardness of the material increases as PVP K15 is added to the formulation. The tensile strength of the IPUC101 material without PVP is 3.4 MPa, but increases to 4.6, 7.4, and 9.6 MPa at loading fractions of 1.5%, 3%, and 5% PVP K15 respectively. The Shore A hardness similarly increases from 35 to 38, 40, and 45 respectively. Notably, the elongation at break does not appear to change significantly. Also, of note is the degree of reinforcement at low loading fraction. Typical fillers require 30-100 phr for adequate reinforcement, whereas PVP K15 reinforcement more than doubles the tensile strength at only 3% loading.

TABLE 1

IPUC101 Formulation

| | Percentage | Supplier | Function |
|---|---|---|---|
| Photomer 6230 | 29.98 | IGM Resins | Oligomer |
| 2-Hydroxyethyl acrylate | 29 | TCI America | Monomer |
| SR440 | 20 | Sartomer | Monomer |
| Genomer 1121 | 20 | Rahn AG | Monomer |
| Omnirad 819 | 1 | IGM Resins | Photo initiator |
| MEHQ | 0.02 | Sigma | Photo inhibitor |
| Total | 100 | | |

TABLE 2

With and Without PVP K15 Reinforcement: Mechanical Properties

| | Tensile strength (MPa) | Elongation at break (%) | Hardness (Shore A) |
|---|---|---|---|
| IPUC101 | 3.4 | 160 | 35 |
| IPUC101-1.5% K15 | 4.6 | 162 | 38 |
| IPUC101-3% K15 | 7.4 | 166 | 40 |
| IPUC101-5% K15 | 9.6 | 160 | 45 |

Table 3 below shows how viscosity of the acrylate resin IPUC101 formulation as a function of temperature without any reinforcing filler as well as with varying amounts of reinforcing filler.

| | IPUC101 | IPUC101 + 1.5% K-15 | IPUC101 + 3% K-15 | IPUC101 + 5% K-15 |
|---|---|---|---|---|
| 30C | 30.70 cP | 36.65 cP | 43.17 cP | 49.31 cP |
| 40C | 20.76 cP | 24.66 cP | 28.78 cP | 31.81 cP |
| 50C | 14.89 cP | 17.46 cP | 20.19 cP | 22.83 cP |
| 60C | 11.30 cP | 13.09 cP | 14.85 cP | 16.58 cP |
| 70C | 8.48 cP | 9.82 cP | 11.24 cP | 12.55 cP |

EXAMPLE 2

Material: Acrylate Matrix Reinforced by a Second Vinylpyrrolidone

In this embodiment, the vinylpyrrolidone is Polyvinylpyrrolidone K12 provided by BASF. The preparation of samples of IPUC101 reinforced with PVP K12 is the same with IPUC101 reinforced by PVP K15 (Mw: 4000-6000). The mechanical properties of PVP K12 reinforced IPUC101 is shown in Table 3. As shown in Table 3, with 5 wt % of loading, there is a 40% of increase in tensile strength. Although the tensile strength was increased, the increase is not as significant as when PVP K15 is the reinforcing agent.

TABLE 3

PVP K12 Reinforcement: Mechanical Properties

| | Tensile strength (MPa) | Elongation at break (%) | Hardness (Shore A) |
|---|---|---|---|
| IPUC101 | 3.4 | 160 | 35 |
| IPUC101-3% K12 | 3.7 | 156 | 40 |
| IPUC101-5% K12 | 4.9 | 161 | 40 |

EXAMPLE 3

Material: Thiol-ene Matrix Reinforced by Poly(Methyl Methacrylate) PMMA

In this embodiment, a new Thiol-ene matrix material, TE14, is a self-formulated (see table 4), elastomeric thiol-ene material with a tensile strength of 1 MPa, elongation at break of 107%, and Shore hardness of 30 A. The reinforcing material PMMA (Mw: 120000) was purchased from Sigma.

TABLE 4

TE14 Formulation

| | Percentage | Supplier | Function |
|---|---|---|---|
| Trimethylolpropane tris(3-mercaptopropionate) | 15.15 | Sigma | Monomer |
| 3,6-dioxa-1,8-octanedithiol | 29.6 | TCI America | Monomer |
| Diallyl phthalate | 53.7 | TCI America | Monomer |
| Vinylphosphonic acid | 0.5 | TCI America | Photo inhibitor |
| Omnirad 651 | 1 | IGM Resins | Photo initiator |
| Pyrogallol | 0.05 | TCI America | Photo inhibitor |
| Total | 100 | | |

Preparation of TE14 reinforced by PMMA

In this embodiment, a desired amount of each of PMMA and TE14 was dispensed into a sealed amber bottle. The mixture was stirred at elevated temperature (for example 70° C.) until all solids were dissolved. Alternatively, PMMA powder and TE14 were added into a container and mixed through a Flextek mixer at room temperature until the powder was dissolved in the solution. The resultant solutions were clear. The composition was stored at room temperature until use.

The reinforcing effect of adding PMMA to the TE14 formulation is shown in Table 5. The tensile strength and Shore hardness of the material increases as PMMA is added to the formulation.

TABLE 5

Reinforcing Effect of Adding PMMA to the TE14 Formulation

| | Tensile strength (MPa) | Elongation at break (%) | Hardness (Shore A) |
|---|---|---|---|
| TE14 | 1.0 | 107 | 30 |
| TE14-3% PMMA | 1.3 | 236 | 32 |
| TE14-5% PMMA | 1.7 | 184 | 35 |

A number of implementations have been described. Nevertheless, it will be understood that various modifications may be made without departing from the spirit and scope of the disclosure. For example, various forms of the materials shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination.

What is claimed is:

1. A composition comprising:
   a UV-curable matrix material, and
   a reinforcing agent having a solubility in UV-curable matrix material that decreases as the UV-curable matrix material is cured,
   wherein the reinforcing agent is present at an amount such that:
   (a) prior to curing the UV-curable matrix material, the reinforcing agent is at least partially dissolved in the UV-curable matrix material, and
   (b) upon curing the UV-curable matrix material, at least a portion of the reinforcing agent is precipitated, thereby forming a phase-separate domain in the cured UV-curable matrix material.

2. The composition of claim 1, wherein the cured UV-curable matrix material comprises a polymer comprising acrylate.

3. The composition of claim 1, wherein the cured UV-curable matrix material comprises a polymer comprising thiol-ene.

4. The composition of claim 1, wherein the UV-curable matrix material comprises a polymer comprising acrylate and thiol-ene.

5. The composition of claim 1, wherein the reinforcing agent has a higher glass-transition temperature than that of the UV-curable matrix material.

6. The composition of claim 1, wherein the reinforcing agent is non-UV-curable.

7. The composition of claim 1, wherein the reinforcing agent is non-reactive with the UV-curable matrix material.

8. The composition of claim 1, wherein the amount of the reinforcing agent is less than about 20 wt %.

9. The composition of claim 1, wherein the reinforcing agent is polyvinylpyrrolidone.

10. The composition of claim 1, wherein the reinforcing agent is poly(methyl methacrylate).

11. The composition of claim 1, wherein the solubility of the reinforcing agent in the UV-curable matrix material decreases as the UV-curable matrix material is cured by UV irradiation.

12. The composition of claim 1, wherein the amount of the reinforcing agent ranges from about 1.5 wt % to about 5 wt %.

13. The composition of claim 9, wherein the polyvinylpyrrolidone has a molecular weight ranging from about 6000 to about 150000.

14. The composition of claim 10, wherein the poly(methyl methacrylate) has a molecular weight of about 120000.

15. The composition of claim 1, wherein the composition has a viscosity ranging from about 10 cps to about 15 cps.

16. The composition of claim 1, wherein the composition has a viscosity ranging from about 31 cps to about 49 cps at about 30° C., from about 21 cps to about 32 cps at about 40° C., from about 15 cps to about 23 cps at about 50° C., from about 11 cps to about 17 cps at about 60° C., or from about 8 cps to about 13 cps at about 70° C.

17. A cured composition being prepared by a method comprising curing the composition of claim 1.

18. The cured composition of claim 17, wherein the composition is cured by UV irradiation.

19. The cured composition of claim 17, wherein the cured composition has a tensile strength which is from about 30% to about 300% higher than that of a comparable cured composition prepared by curing a composition comprising the UV-curable matrix material in absence of the reinforcing agent.

20. The cured composition of claim 17, wherein the cured composition has a tensile strength that is proportional to the amount of the reinforcing agent in the composition.

21. The cured composition of claim 17, comprising a polymer comprising acrylate.

22. The cured composition of claim 17, comprising a polymer comprising thiol-ene.

23. The cured composition of claim 17, comprising a polymer comprising acrylate and thiol-ene.

24. The cured composition of claim 17, comprising polyvinylpyrrolidone or poly(methyl methacrylate).

25. A composition comprising:
   a UV-curable matrix material, and
   polyvinylpyrrolidone or poly(methyl methacrylate), wherein the polyvinylpyrrolidone or poly(methyl methacrylate) is present at an amount such that:
   (a) prior to curing the UV-curable matrix material, the polyvinylpyrrolidone or poly(methyl methacrylate) is at least partially dissolved in the UV-curable matrix material, and
   (b) upon curing the UV-curable matrix material, at least a portion of the polyvinylpyrrolidone or poly(methyl methacrylate) is precipitated, thereby forming a phase-separate domain in the cured UV-curable matrix material.

26. A cured composition being prepared by a method comprising curing the composition of claim 25.

27. A composition comprising:
   a UV-curable matrix material which, upon curing, forms a cured UV-curable matrix material comprising a polymer comprising acrylate, thiol-ene, or the combination thereof, and
   a reinforcing agent having a solubility in UV-curable matrix material that decreases as the UV-curable matrix material is cured,
   wherein the reinforcing agent is present at an amount such that:
   (a) prior to curing the UV-curable matrix material, the reinforcing agent is at least partially dissolved in the UV-curable matrix material, and
   (b) upon curing the UV-curable matrix material, at least a portion of the reinforcing agent is precipitated, thereby forming a phase-separate domain in the cured UV-curable matrix material.

28. A cured composition being prepared by a method comprising curing the composition of claim 27.

29. A composition comprising:
   a UV-curable matrix material which, upon curing, forms a cured UV-curable matrix material comprising a polymer comprising acrylate, thiol-ene, or the combination thereof, and
   polyvinylpyrrolidone or poly(methyl methacrylate), wherein the polyvinylpyrrolidone or poly(methyl methacrylate) is present at an amount such that:
   (a) prior to curing the UV-curable matrix material, the polyvinylpyrrolidone or poly(methyl methacrylate) is at least partially dissolved in the UV-curable matrix material, and
   (b) upon curing the UV-curable matrix material, at least a portion of the polyvinylpyrrolidone or poly(methyl methacrylate) is precipitated, thereby forming a phase-separate domain in the cured UV-curable matrix material.

30. A cured composition being prepared by a method comprising curing the composition of claim 29.

* * * * *